(12) United States Patent
Ghodoussi

(10) Patent No.: US 6,685,765 B1
(45) Date of Patent: *Feb. 3, 2004

(54) WATER BASED PROTECTANT CONTAINING UV ABSORBERS

(76) Inventor: Vahid Ghodoussi, 91 Harbor Village Dr., Memphis, TN (US) 38103

( * ) Notice: Subject to any disclaimer, the term of this patent is extended or adjusted under 35 U.S.C. 154(b) by 0 days.

This patent is subject to a terminal disclaimer.

(21) Appl. No.: 10/029,285

(22) Filed: Dec. 28, 2001

(51) Int. Cl.$^7$ .............................. C09G 1/08; C08L 91/06; C09D 191/06
(52) U.S. Cl. .................. 106/10; 106/271; 510/207; 510/208; 510/417; 510/418; 516/22; 516/38; 516/40; 516/41; 516/42; 516/43; 516/44; 576/45; 576/46; 576/47; 576/51; 576/77
(58) Field of Search ................... 510/207, 208, 510/417, 418; 106/10, 271; 516/38, 40, 41, 42, 43, 44, 45, 46, 47, 51, 22, 77

(56) References Cited

U.S. PATENT DOCUMENTS

| | | |
|---|---|---|
| 3,847,622 A | 11/1974 | Brandl et al. |
| 4,997,478 A | 3/1991 | Gordon |
| 5,017,222 A | 5/1991 | Cifuentes |
| 5,043,012 A | 8/1991 | Shinohara et al. |
| 5,174,813 A | 12/1992 | Cifuentes et al. |
| 5,246,072 A | 9/1993 | Frazier, Jr. et al. |
| 5,288,314 A | 2/1994 | Howard et al. |
| 5,330,787 A | 7/1994 | Berlin et al. |
| 5,435,839 A | 7/1995 | Ogawa |
| 5,487,914 A | 1/1996 | Gerlock et al. |
| 5,501,724 A | 3/1996 | Loff |
| 5,700,312 A | 12/1997 | Fausnight et al. |
| 5,782,962 A | 7/1998 | Burke et al. |
| 5,882,387 A | 3/1999 | Martin et al. |
| 5,913,969 A | 6/1999 | Howe |
| 6,013,323 A | 1/2000 | Klayder et al. |
| 6,193,791 B1 | 2/2001 | Vander Louw et al. |
| 6,206,956 B1 | 3/2001 | Muntz et al. |
| 6,221,433 B1 | 4/2001 | Muntz et al. |
| 2003/0075077 A1 | 4/2003 | Lewis |

FOREIGN PATENT DOCUMENTS

| | | |
|---|---|---|
| EP | 0545872 | 6/1993 |
| GB | 813471 | 5/1959 |

OTHER PUBLICATIONS

Champion Technologies, Surfatrons, Jun. 26, 2003, http://www.championtech.net/CTWEb.nst/902b4da3 . . . .

Primary Examiner—Elizabeth D. Wood
(74) Attorney, Agent, or Firm—Kramer & Amado, P.C.

(57) ABSTRACT

A water-based protective composition for automotive surfaces and the like is disclosed, comprising UV absorbers and light stabilizers. A method of using a water-based protective composition as well as methods of applying said compositions are also disclosed.

40 Claims, No Drawings

WATER BASED PROTECTANT CONTAINING UV ABSORBERS

FIELD OF INVENTION

The present invention relates to compositions useful as a protectant for automotive surfaces including painted, vinyl, chrome, and glass surfaces, as well as other vehicles such as motorcycles, trucks, boats, RVs, or stationary articles, as well as many other hard surface found around the home or garage including glass surfaces. The protectant has several unique features, such as containing UV protectants, and durability. It is water-based, abrasive-free, and virtually free of organic solvents. Furthermore, the compositions are in the form of liquid that can be sprayed onto a surface by means of a pump spray or aerosol. The compositions are easily applied onto painted or glass surfaces and can be applied to wet or dry surfaces, with minimal wiping, leaving a dust-free, streak-free, glossy finish.

BACKGROUND OF THE INVENTION

Traditionally, the steps in waxing/polishing an automobile have been (1) wash the car, (2) dry the car, (3) apply and buff the wax/polish, (4) allow the wax/polish to dry, (5) remove powdery residue from the surface. In contrast, the steps in using the protectant of this invention are simply (1) wash the car, (2) spray protectant onto the wet car and dry the car. The protectant requires no further effort such as buffing and there is no powdery residue to remove. The drying of the car is enough to level the protectant of this invention to a streak-free, glossy finish. Therefore, this is the only wax-containing product that does not require abrasives and does not leave dried residues that need to be removed.

In the past, polishes have required one or more abrasives to level the wax film when it is being applied and during buffing. If the abrasive is eliminated, the result has been a smeary or streaked appearance on the surface. Furthermore, as the solvents evaporate in these types of products, most of the wax and other hydrophobic components such as silicone compounds, are extracted into the dried powdery residue and trapped there. Therefore, wiping off the dried on residues removes much of the wax and other actives in these products. Furthermore, UV protectants could not be effectively incorporated in these products since much of the UV absorbers would be trapped into the residues that are wiped off.

U.S. Pat. No. 5,288,314 discloses a polish for cleaning metallic and fiberglass surfaces, such as automobile, truck and boat bodies, and for providing a protective film on the surface. The polish comprises water in an amount between about 40.0 to about 75.0 percent, a solvent in an amount between about 12.0 to about 35.0 percent, a rheological additive in an amount between about 0.30 to about 1.0 percent, an ultraviolet light absorber in an amount between about 0.05 to about 0.50 percent, a dye in an amount between about 0.0005 to about 3.0 percent, a first silicate in an amount between about 5.0 to about 15.0 percent, dimethylpolysiloxane in an amount between about 0.50 to about 6.0 percent, a silicone resin solution in an amount between about 0.10 to about 3.0 percent, oleic diethanol amide in an amount between about 0.50 to about 2.0 percent, a second silicate in an amount between about 0.10 to about 3.0 percent, and a bactericide in an amount between about 0.05 to about 0.20 percent, by weight of the total polish.

In addition to the effort involved in removing the dried film of such compositions, there are other disadvantages. Paint technology has changed significantly and at present, abrasives are in many cases too aggressive and tend to scratch the painted surface. However, simply removing the abrasives from formulations is not a viable alternative. Abrasives aid in the even distribution of wax and silicone film forming components thereby reducing the tendency to streak. Removing them tends to increase streaking which is not desirable from a consumer's point of view. Furthermore, much of the active components including the ultraviolet absorbers would be lost in the process of removing the residues.

A great deal of research has gone into developing polish compositions that are free from abrasives yet do not streak or smear.

U.S. Pat. No. 5,700,312 discloses an auto finish-treating composition universally useful on paint, metal, vinyl and other plastic finishes comprising of micronized wax dispersed in a water/organic solvent emulsion also containing silicone liquid emulsified in both the organic and aqueous phases.

U.S. Pat. No. 5,882,387 discloses a wipe-on polish composition for automotive surfaces which contains no wax or abrasive components. The polish requires minimal effort to wipe out to a thin, glossy, streak-free, hydrophobic film. The polish is comprised of an emulsion that contains an organopolysiloxane and a volatile diluent.

U.S. Pat. No. 5,913,969 discloses a protective composition for automotive painted surfaces. The polish is comprised of emulsified silicone, an evaporation modifier and an agent, which increases wetting speed, dispersed in water.

Such micronized wax formulation and the polish formulations mentioned above lack durability and usually last for a few weeks only. Furthermore, since micronized wax or silicone oils are not film formers, UV protectants cannot be effectively incorporated in such products.

In view of these problems there is a need for a wax-based protectant that is substantially abrasives-free that does not smear or streak. Furthermore, UV protectants can be effectively incorporated in such a wax protectant to offer protection against sun damage.

It is one object of the present invention to provide a wax-based protectant composition, that is abrasive-free and therefore non-damaging to the clear coat type finishes, which provides protection to a substrate from sources of environmental damage. The sources of environmental damage can include for example, water, rain, acid rain, inorganic salts, dirt, grime, road tar, bird droppings and other environmental contaminants.

It is another object of the present invention to provide a composition that provides protection and screen from sunlight and UV rays to the substrate it is applied to. The UV absorbers and/or UV light stabilizers used in the present invention are hydrophobic in nature and are encapsulated in the wax particles.

It is another object of the present invention to provide a composition that leaves no residue. Therefore, substantial amounts of the wax, UV protectants, and other active components are left on the surface of the substrate. Furthermore, the protectant is very easy to apply since there is no buffing required and there are no powdery residues to remove.

It is another object of the present invention to provide a composition that can be applied to wet or dry surfaces and then wiped dry with no buffing, and provides a streak free, glossy finish. Furthermore, it can be applied to the wet surface to dry and wax the surface in one step.

It is another object of the present invention to provide a composition that can be applied to multiple surfaces such as automotive surfaces. Automotive surfaces include painted, plastic, chrome, glass, and other surfaces of cars, motorcycles, trucks, boats, as well as other vehicles. Furthermore the present invention can be applied to other hard surfaces around the home and garage including furniture articles and glass surfaces.

It is another object of the present invention to provide a composition where the organic phase which may include wax, UV protectants, etc. has a specific gravity substantially close to that of the aqueous phase. This will substantially reduce the settling or separation of the organic phase from the aqueous phase.

It is another object of the present invention to provide a composition that is substantially free of solvents therefore it is environmentally friendly as well as consumer friendly.

It is another object of the present invention to provide a composition that can be delivered in aerosol or pump spray containers. The described invention would greatly reduce the effort needed to apply these materials to the previously mentioned surfaces.

The foregoing objects and any other that become apparent were accomplished by the discovery of a method of turning emulsions/dispersions into suspensions, by neutralizing the surfactants used in making the emulsion/dispersion. One way to accomplish this is by creating an ionic emulsion of one or more film forming polymers, such as wax or urethane polymers, using an ionic surfactant, then, neutralizing it with a counterionic surfactant with a polarity opposite to that of the said ionic surfactant. Another method of making suspensions is to combine two or more ionic emulsions/dispersions where the surfactants in the emulsions/dispersions have opposite charges. For example one emulsion/dispersion containing mainly anionic surfactants is combined with another emulsion/dispersion containing mainly cationic surfactants. Other surfactants such as nonionics may also be present at levels that would not interfere with formation of the suspension. Most surprisingly, the new suspensions show strong affinity towards any surface that is less polar than water such as automotive painted surfaces and glass.

SUMMARY OF THE INVENTION

The present invention provides an aqueous protective composition for automotive surfaces and the like, comprising at a minimum wax, UV protectant, surfactant, and water.

In one aspect of the present invention, an aqueous protective composition comprising at least one wax, at least one UV protectant, at least one surfactant, and between 40% and 99.8% water is disclosed. In yet another aspect of the present invention, an aqueous protective composition comprising at least one wax, at least one UV protectant, at least one surfactant, at least one silicone compound and between 40% and 99.8% water by weight is disclosed. The silicone compound can include, but is not limited to amino-functional silicones, dialkyl silicones, silicone resins, silicone waxes, hydrocarbon silicone copolymers, halogenated-hydrocarbon silicone copolymers, volatile silicones, silanes, silanols, reactive silicones, silicone spreading additives, and combinations thereof. Other embodiments of the present invention may also include film-forming resins, fluorinated resins and surfactants, one or more preservatives, such as bactericides, oleosoluble colorants, as well as other additives, such as thickening agents.

Yet another aspect of the present invention relates to a method of protecting a substrate from sources of environmental damage. The sources of environmental damage can include for example UV rays, water spotting, rain and acid rain, inorganic salts, dirt and grime, road tar, bird droppings and other environmental contaminants. According to one method of the present invention, a substrate is coated with a continuous layer of the protectant composition. The protectant of the present invention may be used on automotive surfaces, boats, RVs, motorcycles, and for almost any hard surface found around the home or garage including glass surfaces. The protectant film provides low surface energies to promote beading, which will reduce spotting brought about by water standing on surfaces. One embodiment of the present invention may be applied by pump spray application or aerosol.

DETAILED DESCRIPTION OF THE INVENTION

The total wax used in this composition can vary from 0.01% to 50% of the total weight of the composition and more preferably from 0.1 to 10% of the total weight of the composition. At least one of the waxes in this composition melts between 40C. and 120C. and can be selected from natural waxes, modified natural waxes, synthetic waxes, or any combination of these. The UV protectant used in this composition can be UVA absorbers, UVB absorbers, UVA&B absorbers, free-radical scavengers, light stabilizers, or any combination of these. The level of UV absorbers can vary from 0% to 15% of the total weight of the composition and more preferably from 0% to 5% of the total weight of the composition. The level of light stabilizers can vary from 0% to 15% of the total weight of the composition and more preferably from 0% to 5% of the total weight of the composition. The total level of silicone oils can vary from 0% to 20% of the total weight of the composition and more preferably from 0% to 5% of the total weight of the composition. The total weight of amino-functional silicones can vary from 0% to 20% of the total weight of the composition and more preferably from 0% to 5% of the total weight of the composition. The surfactant(s) can be anionic, nonionic, cationic, zwitterionic, amphoteric, wetting agents, or any combinations of these. More preferably, combinations of cationic and anionic surfactants are used in a ratio of 1:50–50:1. Mixtures of cationic and anionic surfactants in a ratio of 1:5–5:1 are still more preferred. Small amounts of nonionic or other surfactants may also be present to offer minor advantages. The total weight of the surfactants can vary from 0.1% to 25% of the total weight of the composition and more preferably from 0.1% to 10% of the total weight of the composition. The total weight of the preservatives (bactericide) can vary from 0% to 10% of the total weight of the composition and more preferably from 0% to 4% of the total weight of the composition. The level of water can vary from 40% to 99.8% of the total weight of the composition and more preferably from 75% to 99.8% of the total weight of the composition. Additional benefits may be obtained by incorporating fluorinated polymers, and/or fluorinated film forming resins and/or fluorinated wetting agents.

The waxes are natural substances (animal or vegetable) or synthetic materials solid at ambient temperature (20C.–25C.). They are insoluble in water, soluble in oils and are capable of forming a water repellant film. The wax or waxes constituting the wax mixture are selected from among Carnauba wax, Candelilla wax and Alfa wax, Montan wax, polyethylene wax, paraffin wax, oxidized paraffin wax, ozokerite, vegetable waxes such as olive tree wax, rice wax, hydrogenated jojoba wax or absolute waxes of flowers such as the essential wax of cassis flower sold by Bertin (France); animal waxes such as beeswax, or modified beeswax (cerabellina); other waxes or primary waxy materials: marine waxes such as that sold by Sophim under the name "M82™" natural or synthetic ceramides or polyethylene waxes. Other synthetic waxes include silicone waxes including but not limited to "Silky Wax 10™" sold by Dow Corning. Synthetic waxes may include clear synthetic waxes including but not limited to "Uniclear 80™" and "Uniclear 80V™" sold by Arizona Chemical Company. The vegetable waxes of Carnauba (extract of Copemrica Cerifera), of Candelilla (extract of Euphobies Cerifera and Pedilantus pavonis) and of Alfa (extract of Stipa tenacissima), are commercial products. The mixture of waxes can then be combined with one or more additives including but not limited to mineral oils such as paraffin oil, fluid silicone oils, silicone resins, amino-functional silicones, fluorinated silanes and silicones, fluorinated oils and waxes, petrolatum and lanolin.

The mixture of waxes can also be combined with one or more UV absorbers including UVA absorbers and/or UVB absorbers and/or UVA&B absorbers and/or light stabilizers. There are a number of manufacturers of these UV protectants including but not limited to Ciba, Clariant, Creanova, and Celenase to name a few. One example of a UV absorber is iso-octyl-3-(3-(2H-benzotriazol-2-yl)-5-tertiarybutyl-4-hydrxyphenylpropionate (CASRN 127519-17-9). An example of hindered amine light stabilizers can be Bis(1,2,2,6,6-pentamethy-4-piperdinyl)-sebacate (CASRN 41556-26-7)), or -(methyl)-8-(1,2,2,6,6-pentamethy-4-piperdinyl)-sebacate (CASRN 82919-37-7). A synergistic combination of the above UVA absorber and hindered amine light stabilizers is sold by Ciba as "Tinuvin 5055™". For compositions specific to glass, mainly UV absorbers are incorporated.

The use of surfactants as emulsifying agents in the preparation of wax emulsion/dispersions is known. The production of the emulsion/dispersion can be carried out using anionic, nonionic, and/or cationic surfactants, in a known manner. The anionic surfactants employed are principally salts of fatty acids (for example alkaline salts or organic salts such as amine salts), the said fatty acids having, for example, from 12 to 18 carbon atoms and being able to have a double bond as in the case of oleic acid, alkaline salts or organic base salts of alkyl-sulfuric and alkyl sulfonic acid having 12 to 18 carbon atoms, alkyl-arylsulfonic acids whose alkyl chain contains from 6 to 18 carbon atoms, the aryl group being, for example, a phenyl group. They are also ether-sulfates, in particular the sulfonation products of fatty alcohols and polyalkoxylated alkyl phenols in which the aliphatic chain contains from 6 to 20 carbon atoms and the polyalkoxylated chain from 1 to 30 oxyalkylene units, in particular oxyethylene, oxypropylene or oxybutylene. All these anionic surfactants are well known and many of them are commercial products.

The nonionic surfactants are principally polyalkoxylated and/or polyglycerolated surfactants. They are principally polyalkoxylated and/or polyglycerolated fatty acids or arnides of fatty acids; polyalkoxylated and/or polyglycerolated fatty alcohols or alkylphenols; polyalkoxylated and/or polyglycerolated esters of fatty acids and polyols; polyalkoxylated and/or polyglycerolated 1,2- or 1,3-alkanediols or alkenediols; polyalkoxylated and/or polyglycerolated alkylethers of 1,2- or 1,3-alkanediols or alkenediols. For example, the fatty acids or alcohols, optionally unsaturated, have 12–24 carbon atoms, the alkyl chain of the alkylphenols has 6 to 16 carbon atoms, the alkanediols or alkenediols have from 9 to 24 carbon atoms, the alkyl of the alkyletmers h as from 4 to 20 carbon atoms, and the number o f oxyalkylene units or of ($CH_2CHOHCH_2O$) units can range from 2 to 40. The polyalkoxylated nonionic derivatives are principally polyoxyethylenated, optionally polyoxypropylenated derivatives. The polyalkoxylated fatty acids are commercial products, principally those sold under the trade name "MYRJ™" by Atlas. The polyoxyethylenated esters of fatty acids and polyols for which the polyol is sorbitol are known products (Polysorbate and products sold under the trade name "TWEEN™" by Atlas). When the polyol is glycerol, products sold by Goldschmidt under the trade name "TAGAT™" can be used. The polyoxyethylenated fatty alcohols are commercial products, principally those sold under the mark "BRIJ™" by Atlas. Other useful nonionic surfactants are, for example: triglycerol alkylcarbamates having the general formula: R—NHCOOCH ($CH_2OCH_2CHOHCH_2OH)_2$, wherein R represents a saturated or unsaturated alkyl group having 10–20 carbon atoms. Oxyethylenated or propoxylated derivatives of lanolin alcohols, lanolin fatty acids, or mixtures thereof. Such surfactants are sold by Amerchol under the trade name "SOLULAN™".

The cationic surfactants can be chosen from quaternary ammonium derivatives such as "ARQUAD 16-50™", "ARQUAD 18-50™", "ARQUAD T-50™", "ARQUAD 2C-75™", "ETHOQUAD c/12™", and "ETHOQUAD o/12™", or the amine salts like "Armid O™", "Armid HT™", and "Armak HT™" sold by Akzo Nobel, as well as many others.

It is also possible to commercially obtain wax emulsions/dispersions. There can be employed, for example, the wax sold under the trade name "Michem Lube 160™" and "Michem Lube 160™" from Michelman which contain Carnauba wax in combination with anionic emulsifying agents, "Michem Lube 180™" which contains Carnauba and paraffin waxes, in combination with anionic emulsifying agents "Michem Lube 188™" which contains Carnauba and microcrystalline waxes, in combination with anionic emulsifying agents "Michem Lube 110™", which contains Carnauba and polyethylene waxes, in combination with anionic emulsifying agents. Examples of wax emulsion/dispersions, which contain nonionic surfactants, include "Michem Lube 156™" and "Michem Lube 156™". It is also possible to prepare wax emulsion/dispersions or microdispersions by using commercial mixtures of self-emulsifiable waxes containing the wax and surfactants. There can be employed, for example, the wax sold under the trade name "CIRE AUTO LUSTRANTE OFR™" by Tiscco, which contains Carnauba and paraffin waxes, in combination with nonionic emulsifying agents, or the self-emulsifiable wax sold under the trade name "CERAX A. O. 28/B™" by La Ceresine, which contains Alfa wax in combination with a nonionic emulsifying agent. These commercial mixtures permit the preparation of wax emulsion/dispersions or microdispersions by the addition of water in accordance with the process described above.

There can also be employed ready-to-use wax microdispersions, available commercially as the "SERIE SL SLIPAID™" products of Daniel Products Company, or even "AQUACER™" products of Cerachemie. The wax dispersions or microdispersions are dilutable with water without interfering with the stability of the dispersion or microdispersion. Consequently they can be provided in the form of concentrated compositions the proportions of the ingredients of which can be adjusted to a desired value by the simple addition of water. In the case of ready-made wax emulsion/ dispersions or microdispersions, dispersions of the UV protectants and UV light stabilizers can be blended with the wax emulsion/dispersion. An example of water dispersion of UV absorbers are "Sanduvor VSU™" and "Sanduvor 3225™" for UV absorbers/UV light stabilizers from Clariant Corporation.

The silicones can also be obtained from several sources including but not limited to GE, Dow Corning, and Wacker. The silicone products can also be in the form of straight oils or water emulsions. The examples used here will be those manufactured by Dow Coming while there are many other equivalent products. Where silicone fluids are used, those having a viscosity ranging principally between 0.65 and 100,000 centistokes, preferably between 5 and 5,000 centistokes, are used. An example of a preferred silicone fluid in this range is "DC200–350cs™" fluid. An example of a nonionic water emulsion of this silicone fluid is "DC346™" emulsion.

The organosilicon resin can be a single resin or a mixture of different resins. Generically, it is an organosilicon resinous copolymer which includes $SiO_{4/2}$ units with one or more units selected from the group consisting of $R_3SiO_{1/2}$ units, $R_2SiO_{2/2}$ units, and $RSiO_{3/2}$ units, in a molar ratio such that the number average molecular weight of the resinous copolymer is 1,200–10,000. R is a hydrocarbon group such as alkyl radicals with 1–6 carbon atoms; aryl radicals such as phenyl, tolyl, and xylyl; alkenyl radicals such as vinyl and allyl; and trifluoropropyl radicals. The resin can be used alone or mixed with 1–60% by weight of a linear or branched siloxane fluid of the formula $R_3SiO(R_2SiO)_nSiR_3$ in which R has the meaning defined above. n is 1–100,000, which includes siloxane fluids with viscosities up to 2,500,000 centistokes. For example, a value 500 for n, provides a fluid with a viscosity of 10,000 centistokes.

Organosilicon polymer or resin can also be a siloxane resin copolymer including $R_3SiO_{1/2}$ units and $SiO_{4/2}$ units in a mole ratio such that the number average molecular weight is 1,200 to 10,000. Preferably, the mole ratio is 0.7:1.0, and the number average molecular weight is 5,000. R is previously defined. The resin may contain $R_2SiO_{2/2}$ units and $RSiO_{3/2}$ units. It may also contain 2.5 weight percent silicon bonded OH groups.

An amino-functional polysiloxane contains highly polar pendant aminoalkyl modifying groups that enhance the durability of films formed by polysiloxanes, and promote adhesion of films to a variety of substrates. Particularly preferred amino-functional polysiloxanes include reactive and non-reactive hydrolyzable and non-hydrolyzable derivatives which are wholly, or in part, terminally substituted with aminopropyl, aminobutyl, or diamino pendant chains. The amino-functional polysiloxane has the formula: $R_{3-z}'Q_zSiO(R_2'SiO)_x(R'QSiO)_ySiQ_zR_{3-z}$ where R' is an alkyl group of 1–4 carbons or a phenyl group, provided that at least 50 percent of the total number of R' groups are methyl. Q is an amine functional —R"Z. R" is a divalent alkylene radical of 3–6 carbon atoms, and Z is a monovalent radical such as —NR$_2$''' or —NR''' (CH$_2$)$_n$NR$_2$'''. R''' is hydrogen or an alkyl group of 1–4 carbon atoms. n is 2–6. z is 0 or 1. x is 25–3000. y is 0–100 when z is 1 but y is 1-100 when z is 0. In all cases, y is not greater than one tenth the average value of x. Suitable R' groups are methyl, ethyl, propyl, isopropyl, butyl, isobutyl, and phenyl, provided that at least 50% of the R' groups are methyl. Alkylene radicals R" include trimethylene, tetramethylene, pentamethylene, —CH$_2$CHCH$_3$CH$_2$—, and —CH$_2$CH$_2$CHCH$_3$CH$_2$—. Siloxanes where R" is trimethylene or an alkyl substituted trimethylene radical such as —CH$_2$CHCH$_3$CH$_2$— are preferred. Alkyl groups represented by R''' include methyl, ethyl, propyl, isopropyl, butyl, and isobutyl. Useful Z radicals include unsubstituted amine radicals such as —NH$_2$, alkyl substituted amine radicals such as —NHCH$_3$, NHCH$_2$CH$_2$CH$_2$CH$_3$ and —N(CH$_2$CH$_3$)$_2$; and aminoalkyl substituted amine radicals such as —NHCH$_2$CH$_2$NH$_2$, —NH(CH$_2$)NH$_2$, and —NH$_2$CH$_2$CH$_2$N(CH$_3$)$_2$. When z is zero, the polymer has only pendent amine functional substituents in the chain. When z is one, the polymer may have only terminal amine functional substituents, or both terminal and pendent amine functional substituents in the chain. Preferably, x varies from 25–100. y varies from 0–100 when z is one and 1–100 when z is zero. Most preferably, the sum of x+y is 50–500. An example of an amino-functional emulsion includes but is not limited to "DC929™" sold by Dow Corning. An example of reactive amino-functional silicone oil includes but is not limited to "DC536™" oil sold by Dow Corning, which contains amino and methoxy functional groups.

Other film-forming polymers useful in the composition of the invention can be anionic, cationic, nonionic or amphoteric polymers. There can be employed synthetic polymers or polymers of natural origin, chemically modified or not modified. Mention can principally be made of cationic polymers, which are polymers of the polyamine, polyaminopolyamide or quaternary polyammonium type in which the amine or ammonium group is a part of the polymer chain or is linked to it; they generally have a molecular weight ranging from 500 to 3,000,000. As useful cationic film-forming polymers, mention can be made, for example, of: (1) vinylpyrrolidone/dialkylaminoalkyl acrylate or methacrylate copolymers (quatemized or not), such as those sold under the trade names "GAFQUAT™" by GAF Corp., as for example, "Copolymer 845™", "GAFQUAT 734™" or "735™", (2) cellulose ether derivatives having quaternary ammonium groups and principally polymers sold under the designations "JR™", such as "JR 125™", "JR 400™", "JR 30M™", and "LR™", such as "LR 400™" and "LR 30™" by Union Carbide Corp., cationic cellulose derivatives such as "CELQUAT L200™" and "CELQUAT H 100™", which are sold by National Starch or those sold by Akzo Nobel under the designation "LEOGARD GP™",; (3) cationic polysaccharides "JAQUAR C135™" sold by Meyhall; (4) cationic polymers containing alternate units of the formula: —A—Z—, wherein A represents a radical containing two amine functions and the Z groups represent at least one bivalent radical; (5) cyclopolymers such as the homo- and copolymers of dimethyl diallylammonium chloride sold under the designation "MERQUAT™" by Merck; (6) the quaternized vinylimidazolium-vinylpyrrolidone copolymers such as those sold under the trade name "LUVIQUAT FC™ or HM™" by BASF.

The anionic film-forming polymers are polymers having anionic groups, in particular carboxylic and/or sulfonic groups. The preferred anionic polymers employed in the compositions of this invention are selected principally from among: (1) the homo- or copolymers of acrylic or methacrylic acids or their salts and their esters and in particular the products sold under the trade names "VERSICOL F™" or "VERSICOL K™" by Allied Colloid, "ULTRAHOLD 8™" by Ciba-Geigy, the copolymers of acrylic acid and acrylamide sold under the form of their sodium salt under the designation "RETEN TM™" by Hercules, sodium polymethacrylate sold under the designation "DARVAN No 7™" by Vanderbilt, the sodium salts of polyhydroxycarboxylic acids, sold under the trade name "HYDAGEN F™" by Henkel; (2) copolymers derived from crotonic acid and their esters; (3) polymers or copolymers derived from maleic, fumaric or itaconic acids or anhydrides with vinylic or phenylvinylic or acrylic derivatives, these polymers being able to be esterified. Among these polymers, mention can be made of the polymers sold under the designations "GANTREZ™" by the GAF Corporation or "EMA ™" by Monsanto. Polymers also belonging in this class are the copolymers of maleic, citraconic or itaconic anhydrides and an allylic or methallylic ester having optionally an acrylamide or methacrylamide group in their chain, monoesterified or monoamidified; (4) useful polymers having sulfonic groups in accordance with the invention are selected principally from among: salts of polystyrene sulfonic, polyacrylamide sulfonic salts, or polyester salts such as those sold under the trade name "POLYMER EASTMAN AQ™" by Kodak.

The amphoteric film-forming polymers useful in the compositions of the invention are aprincipally polymers having M and M' units statistically distributed in the polymer chain, where M represents at least one unit derived from a monomer having at least one basic nitrogen atom and M' represents at least one unit derived from an acid monomer having one or more carboxylic or sulfonic groups, or even M and M' can represent groups derived from zwitterionic monomers of carboxybetaine. M and M' can also represent a cationic polymer chain having secondary, tertiary or quaternary amine groups, in which at least one of the amino groups has a carboxylic or sulfonic group linked by the intermediary or a hydrocarbon chain, or even M and M' are part of a chain of a polymer having an ethylene alpha-, beta dicarboxylic unit of which one of the carboxylic groups has reacted with a polyamine having one or more primary or secondary amine groups. Mention can be made, for example, of: (1) polymers or copolymers having units derived: (a) from at least one monomer selected from among the acrylamides or methacrylamides, substituted at the nitrogen by an alkyl radical, (b) from at least one acid monomer containing one or more reactive carboxylic groups, and (c) from at least one basic comonomer such as esters having a primary, secondary, tertiary or quaternary amine substituent of acrylic and methacrylic acids and the quatemrization products of dimethylaminoethyl methacrylate with dimethyl or diethyl sulfate. As compounds representative of this class mention can be ma de of "AMPHOMER™" sold by Natural Starch; (2) polymers derived from chitosan; (3) copolymers of diallyl dialkyl (C1–C4) ammonium/acrylic acid such as the product sold under the trade name "MERQUAT 280™" by Merck which is a copolymer of diallyl dimethyl ammonium chloride/acrylic acid.

The nonionic film-forming polymers useful in the composition s of the invention are principally: (1) the homo- and/or copolymers of vinylpyrrolidone such as the polyvinylpyrrolidone/vinyl acetate copolymer sold under the trade name "PVP/PVA S-630™" by GAF, or the trade name "LUVISKOL™" by BASF; (2) the nonionic vinylic homopolyners or copolymers such as polyvinyl alcohol sold under the trade name "MOWIOL 4088™" by Hoechst; (3) derivatives of polyaspartic acid; or even (4) polyglycols such as polyethylene glycols. Mention can also be made of the family of polyurethanes in solution or anionic, cationic or nonionic dispersions.

The dye must be an oil soluble dye in order for the color of the dye to be retained in the present protectant composition. It cannot be a water-soluble dye. The four dye colors are each used in a different colored embodiment of the protectant of this invention. Each colored embodiment can be used in a range of colored surfaces. In particular, a colored embodiment of the present application can be used in several different shades. For example, the red colored embodiment can be used in about five to about ten different shades of a red surface. The four preferred dyes are green, black, red and blue colorings. The black dye is preferably from the azine dye chemical family and is known as Nigrosine base N or solvent black 7 CASRN 8005-02-5. The red dye is preferably from the bis-azo dye chemical family and has the formula $C_{25}H_{22}N_4O$. The blue dye is preferably from the anthraquinone dyestuff chemical family and has the chemical formula $C_{30}H_{42}N_2O_2$. The dye is present in an amount between about 0.0005 and about 2.0 percent by weight of the total protectant composition.

The composition can be thickened if des i red. Among the thickeners useful in the compositions of the invention mention can also be made of cellulosic and saccharidic polymers such as hydroxymethyl cellulose, carboxymethyl cellulose, hydroxybutyl cellulose, hydroxypropyl cellulose, and more particularly, hydroxyethyl cellulose, in particular the products sold under the trade name "NATROSOL™" by Hercules or "CELLOSIZE™" by Union Carbide, methylhydroxypropyl cellulose, in particular the products sold under the trade name "METHOCEL™" by Dow Chemical or heterobiopolysaccharides such as for example, xanthan gums sold under the marks "KELTROL™" and "KELZAN™" by Kelco, "RHODOPOL™" and "RHODIGEL™" by Rhone Poulenc, or "ACTIGUM™" by Ceca/Satia, gum arabic, guar gum, Karoya gum, alginates and carraghenates, hyaluronic acid and its derivatives. Other film-forming polymers can be selected from among hydroxyethyl cellulose, gum arabic, polyvinylpyrrolidone, cationic cellulose derivatives, sodium polymethacrylate and keratin hydrolyzates. Other known thickening agents can be employed and are selected, for example, from among polyacrylic acids crosslinked by a polyfunctional agent such as the products sold under the designation "CARBOPOL™" by Goodrich, such as "CARBOPOLS 910 ™, 934 ™, 934 ™, 940 ™, 941 ™, 980 ™, 1342™, EZ1™, EZ2™", natural or modified clays such as the "LAPONITES™", of Laporte or "VEEGUM™", of Vanderbilt or polyurethanes.

Examples of fluorinated polymers include but are not limited to fluorochloroamide polymers, polytrifluorochloroethylene, fluorochloroalkyl polymers, fluorochloroacrylic polymers, chlorofluorosilicone polymers and the like. The preferred halofluorinated polymers are the fluorochloroamide polymers sold under the trademark "FLUOROLINK 418™" sold by Ausimont, U.S.A. Others include "FLUOROLINK (201)™" a chlorofluoro phosphate ester, "FLUOROLINK 407™" a chlorofluorosilane and "FLUOROLINK 300™" a chlorofluorocarboxylic acid. The spreading (wetting) additives can be fluorinated derivatives such as those sold by 3M under the name "FLUORAD™" and those sold by Dupont under the name "Zonyl™", or copolyol dimethicone surfactants having a high HLB available from Dow Coming, Goldschmidt, etc.

One or more preservatives (bactericide) can also be incorporated in the composition of this invention. Several different manufacturers exist that provide preservatives (bactericide) including but not limited to "Dowicil™" products from Dow Chemical and "Kathon™" products from Rohm & Haas.

The compositions according to the invention are obtained by forming an emulsion. Generally, these compositions are obtained by a process principally characterized by the fact that the wax and the emulsifying agent(s) are heated to a temperature greater than the melting temperature of the wax and not greater than 100 degree Celsius, optionally in the presence of a portion of the water, until the wax is completely melted; the water is also heated to a temperature at least equal to the said temperature employed to melt the wax and then the melted wax can be added to the water, or the remainder of water is progressively added to the wax, while stirring, until a wax emulsion is formed in a continuous aqueous phase, and then permitting the whole to cool to ambient temperature. Also, the surfactant(s) can be divided into the water phase and the oil phase before combining the two. A stable wax dispersion/emulsion is thus obtained. The emulsifier/surfactant used is preferably anionic or cationic. More preferably anionic surfactants are used for preparation of the wax emulsion.

The liposoluble ingredients, for example, UV absorbers/light stabilizers, are generally added to the wax prior to the formation of the dispersion. These liposoluble ingredients can alternatively be added as a dispersion to the wax dispersion keeping the ionic character the same. For example an anionic dispersion of the UV absorbers/light stabilizers is added to anionic wax dispersions while a cationic dispersion of the UV absorbers/light stabilizers is added to cationic wax dispersions. Nonionic dispersions of the UV absorbers/light stabilizers can be combined either with anionic or cationic wax dispersion. The water-soluble ingredients can be added in the water used to produce the dispersion, or in the finally obtained wax dispersion. Also, the secondary ingredients optionally present in the composition are added either to the starting products or to the finished composition.

The compositions of the invention are applied either to the automotive surfaces including glass, or other surfaces mentioned before. The composition obtained can exhibit all other characteristics, which have been described above. The following examples are used to illustrate the preparation of a wax suspension. Similar methods can be used to prepare suspensions of other film forming polymers and/or silicone compounds.

EXAMPLES SHOWING PREPARATION OF WAX DISPERSION

Example A

|  | A |
| --- | --- |
| Carnauba wax | 20–35% |
| Tinuvin 5055 ™ obtained from Ciba | 10–15% |
| Morpholine Oleate | 5–10% |
| Water | balance |

The mixture of wax(es), UV protectants, and surfactant(s) is heated to 90 degree Celsius (generally 10 degree Celsius above the melting point of the wax or mixture of waxes and fatty bodies) while homogenizing with moderate stirring. While continuing to stir, water heated to 90 degree Celsius is incorporated therein. The emulsion can be obtained by the addition of water to melted wax or more preferably by the addition of melted wax to water. The resulting emulsion is cooled to ambient temperature and forms a dispersion of particles based on wax(es). The wax emulsion/dispersion can also be made by holding out some water and addition of remaining water after homogenizing the emulsion. The latter method has the benefit of quickly lowering the temperature of the wax emulsion/dispersion by using water at ambient temperature.

The wax emulsion of example A can also incorporate oils including silicone oils or silicone fluids. Incorporation of silicone oils or other oils in this emulsion/dispersion will result in improved rub out properties. An example of this using 350 centistokes dimethylpolysiloxane fluid is shown below:

Example B

|  | B |
| --- | --- |
| Carnauba wax | 20–35% |
| Tinuvin 5055 ™ obtained from Ciba | 5–10% |
| DC200 350cs ™ obtained from Dow Corning | 1–5% |
| Morpholine Oleate | 5–10% |
| Water | balance |

The wax emulsions of examples A or B can be used as is or may be diluted down by addition of water before use. More preferably, a counterionic surfactant can be added to create a wax suspension as follows:

Example C

|  | C |
| --- | --- |
| Emulsion of Example A or B | 1–20% |
| 4% Armak HT ™ (obtained from Akzo Nobel) solution in water | 0.5–15% |
| Kathon ICP/CG ™ from Rohm & Haas | 0.02–1% |
| Water | balance |

By neutralizing the surfactant in this fashion, a wax suspension is created surrounded by the neutralized surfactant particles that are created in situ. This new surfactant is very mild as compared to the original surfactants in the composition and keeps the wax particles from agglomeration and prohibits formation of hard particles. This wax suspension is very hydrophobic in nature and the suspended wax particles attach to any substrate that is less polar than water such as most automotive surfaces and other surfaces mentioned earlier.

Another approach altogether is to combine the anionic emulsion of A or B with a cationic emulsion to achieve the same neutralization of surfactants and the improved properties desired. Furthermore, additional surfactant can be used to neutralize any remaining unreacted surfactant in the composition. An example of this is shown here:

Example D

|  | D |
| --- | --- |
| Emulsion of Example A or B | 1–20% |
| DC929 ™ cationic emulsion obtained from Dow Corning | 1.5–30% |
| 4% Armak HT ™ (obtained from Akzo Nobel) solution in water | 0.5–15% |
| Kathon ICP/CG ™ from Rohm & Haas | 0.05–1% |
| Water | balance |

In the Example D above a balance of wax, UV protectants, silicone oils, and amino-functional silicones is obtained. By neutralizing the surfactants in this fashion, a wax suspension is created surrounded by the neutralized surfactant particles that are created in situ. This new surfactant is very mild as compared to the original surfactants in the composition and keeps the wax particles from agglomeration and formation of hard particles. This suspension of wax particles has many improved characteristics including minimal effort to wipe out to a streak free hydrophobic film offering UV protection. The wax suspension is very hydrophobic in nature and the suspended particles adhere to any substrate that is less polar than water including glass surfaces. Furthermore, while the silicone oils increase gloss substantially, the amino-functional silicones increase gloss and durability of the protectant. Example D can also be diluted down with water to the desired level of actives at a later time.

The above examples can further contain a solvent, which is added to the wax or water portion or the final mixture. For instance, a polar solvent such as propylene glycol can be added to the water portion to keep the wax dispersion or the final wax suspension from drying too quickly. Solvents with low polarity such as mineral spirits can be added to the organic phase before emulsification to help soften the wax further in the final composition. In a similar fashion both of these solvents or other organic solvents can be incorporated.

One or more film forming polymers can also be incorporated in these embodiments. For instance polyurethane or acrylic resins can be blended in the melted wax before emulsification. Polyvinylpyrrolidone (PVP) or other high polarity film formers can be added to the water phase of the emulsion such as examples A or B or to the finished product of examples C or D.

Colorants must be added to the wax, preferably to the molten wax, before the emulsification step. Therefore these colorants can be added to the organic phase of examples A or B or the like.

Thickeners can be added to either phase depending on the type of thickener, however, most are added to the final product and are dispersed in the water suspension. For instance the Carbopols can be added to the final product and then activated after it is dispersed. The cellulosic thickeners, Laponites, the clays, and the gums can be added to the water phase or the final product as well. In general, however, lower viscosity is desired to accommodate pump spray application. Few of the thickeners such as Laponites offer easy shear thinning which renders it useful for pump spray application of this invention.

An example of a composition containing UV protectants for glass or other transparent surfaces, which can also be used on all other surfaces mentioned before including any other automotive surfaces, can be as follows. The mixture of wax(es), and surfactant(s) is heated to 90 degree Celsius (generally 10 degree Celsius above the melting point of the wax or mixture of waxes and fatty bodies) while homogenizing with moderate stirring. While continuing to stir, water heated to 90 degree Celsius is incorporated therein. The emulsion can be obtained by the addition of water to melted wax or more preferably by the addition of melted wax to water. Also, the surfactant(s) can be divided into the water phase and the oil phase before combining the two. The resulting emulsion is cooled to ambient temperature and forms a dispersion of particles based on wax(es) as described in example E:

Example E

|  | E |
| --- | --- |
| Carnauba wax | 20–35% |
| Sanduvor VSU ™ obtained from Clariant | 10–15% |
| Morpholine Oleate | 5–10% |
| Water | balance |

The wax emulsion of example E can then be diluted by addition of water and used. More preferably, a counterionic surfactant can then be added to create a wax suspension as follows:

Example F

|  | F |
| --- | --- |
| Emulsion of Example E | 1–20% |
| 4% Armak HT ™ (obtained from Akzo Nobel) solution in water | 0.5–15% |
| Kathon ICP/CG ™ from Rohm & Haas | 0.02–1% |
| Water | balance |

By neutralizing the surfactants in this fashion, a wax suspension is created surrounded by the neutralized surfactant particles that are created in situ. This new surfactant is very mild as compared to the original surfactants in the composition and keeps the wax particles from agglomeration and formation of hard particles. This suspension of wax particles has many improved characteristics including minimal effort to wipe out to a streak free hydrophobic film offering UV protection. The wax suspension is very hydrophobic in nature and the suspended particles adhere to any substrate that is less polar than water including automotive surfaces and glass surfaces.

The suspension of wax particles in the above examples and similar compositions arrived at by neutralizing the surfactants used in the emulsification, have many improved characteristics including minimal effort to wipe out to a glossy, streak free, hydrophobic film, where the foregoing objects and any others that become apparent were accomplished by this discovery. The wax suspension is very hydrophobic in nature and the suspended particles attach to any substrate that is less polar than water. Numerous other examples can be offered by adding or replacing waxes and/or UV absorbers or oils and/or surfactants and/or silicone fluids or resins and/or functional silicone fluids or resins and/or fluorinated resins and oils and/or preservatives (bactericide), etc. without departing from the spirit and scope of the invention as defined by the appended claims. Numerous other examples can also be offered by adding one or more film formers, spreading (wetting) additives, fluorinated compounds, thickeners, or other aforementioned compounds without departing from the spirit and scope of the invention as defined by the appended claims. Minor synergisms may also be obtained by adding one or more of these components or making minor substitutions that are known to the art.

EXAMPLES SHOWING UTILITY OF THE INVENTIVE WATER BASED PROTECTANT

A) Durability

Four metal panels were spray painted with "Imron™ 6000 Black" automotive paint obtained from DuPont corporation.

These panels were then treated with the water based protectant of Example D. The treatment included first washing the panels with "Sunlight™" dishwashing detergent to remove any film or wax on the surface. The protectant was then sprayed on the surface of each panel and was then wiped in a circular motion to dryness. The panels felt smooth to the touch and had a very high gloss. Water was then sprayed on the panels, which formed regular beads with high contact angles.

Three of the panels were then positioned on an exterior wall having a southern exposure on Jul. 3, 2001. These panels were positioned at a 45° angle, relative to the vertical, with the painted surface being exposed to daylight. The fourth panel was kept in a drawer unexposed to light. The panels were then brought inside and tested for water-repellency by spraying water onto the panels and for gloss by comparing them to the unexposed panel on a monthly basis. The following observations were made as the average of the three panels:

| Days of Exposure | Water Repellency | Gloss |
| --- | --- | --- |
| 0 | Very High | Very High |
| 30 | High | Very High |
| 60 | Medium-High | High |
| 92 | Medium-High | High |
| 123 | Medium | Medium-High |

Here, the water repellency is rated very high if the beading is regular and the size of majority of the water droplets are less than 5 mm in diameter. The water repellency is rated high when the beading is regular but the size of the majority of the water droplets are between 5 mm and 1 cm in diameter. The water repellency is rated medium-high when there is regular beading but there are some water droplets that are 1 cm to 2 cm in diameter. Finally, the rating of medium for water repellency indicates that there is still water beading but that there are some irregular beading and there are several water droplets that are 1 cm to 2 cm in diameter. The gloss evaluations were based on the appearance of the panels relative to the unexposed panel.

The testing has shown that this protectant lasts at least 4 months or longer. Therefore, formulations of this type are much more durable than those suggested for example by U.S. Pat. No. 5,913,969 which are to last 4 weeks.

B) UV Protection

Five glass panels were spray painted with PPG™ automotive clear coat paint using the following two component paint system:

| Concept ® 2021 Urethane Clear | DCU2021 | 4 parts |
| --- | --- | --- |
| Medium Temperature DT Reducer | DT 870 | 1 part |
| General Purpose Hardener | DCX61 | 1 part |

The glass panels were coated twice with the above paint system with a 15 minute wait time in between the two coats. The panels were then left to cure for five days.

On Oct. 15, 2001, each panel was divided into two half sections by using a masking tape. One side was treated with the protectant of Example D while the other side was left untreated. The UV transmission was measured across each panel with a UVTEX A+B idm made by Optix Tech, Inc. to measure the total UVA+B transmission in mW/m$^2$ at 300 nm through the film. The following results were obtained:

| Panel | UVA + B Untreated | UVA + B Treated |
| --- | --- | --- |
| 1 | 2.4 | 1.4 |
| 2 | 2.3 | 1.4 |
| 3 | 2.4 | 1.3 |
| 4 | 2.5 | 1.4 |
| 5 | 2.2 | 1.2 |
| Average | 2.36 | 1.34 |

The results indicate 43.2% less UVA+B passes through the clear coat finish that was treated with this protectant versus the untreated clear coat finish. This shows that application of the inventive protectant formulation to the clear-coat finish can cut the UVA+B reaching the pigments in the basecoat to almost half of what it would be without it.

I claim:

1. A surface coating composition for application to automotive surfaces, comprising:
   at least one wax;
   an ultraviolet protectant;
   a surfactant composition comprising an anionic surfactant and a cationic surfactant; and
   approximately between 40% and 99.8% water by weight.

2. The composition of claim 1, wherein the wax is selected from the group consisting of natural waxes, synthetic waxes, microcrystalline waxes, silicone waxes, and combinations thereof.

3. The composition of claim 2, wherein at least one of the waxes has a melting point in the approximate range of 40C and 120C.

4. The composition of claim 1, wherein the ultraviolet protectant is selected from the group consisting of an UVA absorber, an UVB absorber, an UVA-B absorber, a free radical scavenger, a light stabilizer, and combinations thereof.

5. The composition of claim 1, wherein the surfactant composition additionally comprises a nonionic surfactant, a zwitterionic surfactant, an amphoteric surfactant, or combinations thereof.

6. The composition of claim 1, further comprising an organic solvent.

7. The composition of claim 6, wherein the organic solvent is selected from the group consisting of hydrocarbon solvents, oxygenated solvents, and oxygenated amines.

8. The composition of claim 7, wherein the hydrocarbon solvents are selected from the group consisting of petroleum distillates, mineral spirits, xylene, lacolene, kerosene, and combinations thereof.

9. The composition of claim 7, wherein said oxygenated solvents are selected from the group consisting of alcohols, glycols, glycol ethers, acetates and combinations thereof.

10. The composition of claim 7, wherein the oxygenated amines are selected from the group consisting of ethanolamine, isopropanolamine, amides and combinations thereof.

11. The composition of claim 1, further comprising at least one fluorinated spreading additive.

12. The composition of claim 1, further comprising at least one fluorinated polymer.

13. The composition of claim 1, further comprising at least one additive selected from the group consisting of preservatives, thickening agents and colorants.

14. The composition of claim 1, further comprising a film-forming polymer.

15. The composition of claim 14, wherein said film-forming polymer is selected from the group consisting of acrylic, polyester, polyvinylpyrrolidone, alkyd, urethane, and combinations thereof.

16. The composition of claim 1, wherein the coating is substantially free of abrasives.

17. The composition of claim 1, further comprising at least one silicone compound.

18. The composition of claim 17, wherein the silicone compound is selected from the group consisting of amino-functional silicones, dialkyl silicones, silicone resins, hydrocarbon silicone copolymers, halogenated-hydrocarbon silicone copolymers, volatile silicones, silanes, silanols, alkoxy-functional silicone polymers, silicone spreading additives, and combinations thereof.

19. The composition of claim 17, further comprising a wax selected from the group consisting of natural waxes, synthetic waxes, microcrystalline waxes, silicone waxes and combinations thereof.

20. The composition of claim 19, wherein at least one of the waxes has a melting point in the approximate range of 40C and 120C.

21. The composition of claim 17, wherein the ultraviolet protectant is selected from the group consisting of an UVA absorber, an UVB absorber, an UVA-B absorber, a free radical scavenger, a light stabilizer and combinations thereof.

22. The composition of claim 17, wherein the surfactant composition additionally comprises a nonionic surfactant, a zwitterionic surfactant, an amphoteric surfactant, or combinations thereof.

23. The composition of claim 17, further comprising an organic solvent.

24. The composition of claim 23, wherein the organic solvent is selected from the group consisting of hydrocarbon solvents, oxygenated solvents and oxygenated amines.

25. The composition of claim 24, wherein the hydrocarbon solvents are selected from the group consisting of petroleum distillates, mineral spirits, xylene, lacolene, kerosene, and combinations thereof.

26. The composition of claim 24, wherein said oxygenated solvents are selected from the group consisting of alcohols, glycols, glycol ethers, acetates and combinations thereof.

27. The composition of claim 24, wherein the oxygenated amines are selected from the group consisting essentially of ethanolamine, isopropanolamine, amids and combinations thereof.

28. The composition of claim 17, further comprising at least one fluorinated spreading additive.

29. The composition of claim 17, further comprising at least one fluorinated polymer.

30. The composition of claim 17, further comprising at least one additive selected from the group consisting of preservatives, thickening agents and colorants.

31. The composition of claim 17, further comprising a film-forming polymer.

32. The composition of claim 31, herein said film-forming polymer is selected from the group consisting of acrylic, polyester, polyvinylpyrrolidone, alkyd, urethane, and combinations thereof.

33. The coating of claim 17, wherein the coating is substantially free of abrasives.

34. A surface coating composition for application to transparent surfaces, comprising:

at least one wax compound;

at least one ultraviolet protectant;

a surfactant composition comprising an anionic surfactant and a cationic surfactant; and approximately between 40% and 99.8% water by weight.

35. The composition of claim 34, wherein the wax is selected from the group consisting of natural waxes, synthetic waxes, microcrystalline waxes, silicone waxes and combinations thereof.

36. The composition of claim 34, wherein at least one of the waxes has a melting point in the approximate range of 40C and 120C.

37. The composition of claim 34, wherein the ultraviolet protectant is selected from the group consisting of an UVA absorber, an UVB absorber, an UVA-B absorber, a free radical scavenger, a light stabilizer and combinations thereof.

38. The composition of claim 34, wherein the surfactant composition additionally comprises a nonionic surfactant, a zwitterionic surfactant, an amphoteric surfactant, or combinations thereof.

39. The composition of claim 34, further comprising a silicone compound.

40. The composition of claim 39, wherein the silicone compound is selected from the group consisting of amino-functional silicones, dialkyl silicones, silicone resins, hydrocarbon silicone copolymers, halogenated-hydrocarbon silicone copolymers, volatile silicones, silanes, silanols, alkoxy-functional silicone polymers, silicone spreading additives, and combinations thereof.

* * * * *

UNITED STATES PATENT AND TRADEMARK OFFICE
CERTIFICATE OF CORRECTION

PATENT NO.     : 6,685,765 B1
DATED          : February 3, 2004
INVENTOR(S)    : Vahid Ghodoussi It is certified that error appears in the above-identified patent and that said Letters Patent is hereby corrected as shown below:

<u>Column 18,</u>
Line 8, replace the word "herein" with the word -- therein --.

Signed and Sealed this

Sixteenth Day of March, 2004

JON W. DUDAS
*Acting Director of the United States Patent and Trademark Office*